US006098689A

United States Patent [19]

Fiwek

[11] Patent Number: 6,098,689

[45] Date of Patent: Aug. 8, 2000

[54] PROCESS AND DEVICE FOR DECORATING PACKAGES WITH CONVEX SURFACES

[76] Inventor: Wolfgang Fiwek, Obere Lindenstrasse 2, Wohltorf D-21521, Germany

[21] Appl. No.: 08/930,464

[22] PCT Filed: Mar. 2, 1996

[86] PCT No.: PCT/DE96/00365

§ 371 Date: Dec. 5, 1997

§ 102(e) Date: Dec. 5, 1997

[87] PCT Pub. No.: WO96/29248

PCT Pub. Date: Sep. 26, 1996

[30] Foreign Application Priority Data

Mar. 8, 1995 [DE] Germany ........................... 195 09 984

[51] Int. Cl.[7] ............................. B44C 31/00; B31F 5/00; B65C 9/00; B32B 31/00

[52] U.S. Cl. .......................... 156/540; 156/556; 156/567; 156/582; 156/583.8; 156/DIG. 18; 156/DIG. 36

[58] Field of Search .................................... 156/230, 238, 156/240, 247, 277, 289, 446, 447, 458, 540, 567, 556, DIG. 26, DIG. 13, DIG. 21, 586, 583.7, 583.8, DIG. 18, DIG. 36, 205, 470, 359; 101/23, 34

[56] References Cited

U.S. PATENT DOCUMENTS

| | | | |
|---|---|---|---|
| 2,674,299 | 4/1954 | Bruker | 154/31 |
| 3,616,073 | 10/1971 | McGirr | 156/470 |
| 4,806,197 | 2/1989 | Harvey | 156/449 |
| 5,147,495 | 9/1992 | Douglas | 156/540 |
| 5,156,714 | 10/1992 | Thomas | 156/472 |
| 5,571,368 | 11/1996 | Barge | 156/359 |

FOREIGN PATENT DOCUMENTS

| | | | |
|---|---|---|---|
| 0 183 440 | 6/1986 | European Pat. Off. | B41F 16/00 |
| 0 511 605 | 4/1992 | European Pat. Off. | B41M 5/035 |
| 32 40 041 | 5/1984 | Germany | B41M 5/26 |
| WO 94/05515 | 3/1994 | WIPO | B44C 1/165 |
| WO 96/09966 | 4/1996 | WIPO | B65C 9/18 |

OTHER PUBLICATIONS

Derwent Abstract for DE 32 41 041.

Derwent Abstract for EP 0 511 605.

European Search Report of Corresponding Application, PCT/DE/96/00365 of Jul. 4, 1996.

*Primary Examiner*—Richard Crispino

*Assistant Examiner*—J. A. Lorengo

*Attorney, Agent, or Firm*—Darby & Darby

[57] ABSTRACT

A method and device is disclosed for continuously decorating packages with convex surfaces is disclosed. The device includes a driveable continuous transport conveyor with uniformly spaced, driveable and rotating receiving means for the packages. It also includes a driveable continuous carrier conveyor with uniformly spaced decorations, and a contact region which forms a transfer location, having a region of the transfer location means for applying pressure onto the carrier conveyor in the direction of the packages and means for heating the decoration. The drive means for the transport conveyor (4) and the carrier conveyor (7, 7') are designed for opposing directions of movement, the means for applying pressure and heat are formed by a guide element, which is moveable transversely to the direction of movement of the carrier conveyor (7, 7') and which is pre-loaded, and which is formed as a heating element, and the means for heat post-treatment comprise a stationary temperature-controlled heat source and a transport conveyor for the packages (5).

22 Claims, 4 Drawing Sheets

PROCESS AND DEVICE FOR DECORATING PACKAGES WITH CONVEX SURFACES

BACKGROUND OF THE INVENTION

1. Field of the Invention

The invention relates to a continuous process wherein the packages are moved on a transport conveyor with a superimposed autorotation and the decorations are moved on a carrier conveyor tangentially past a transfer location with constant velocities, wherein at the transfer location the decorations are sequentially transferred to the packages through the application of pressure and heat.

The invention also relates to a corresponding apparatus having a driveable continuous transport conveyor with equally spaced, driveable and rotating receiving means for the packages, a driveable continuous carrier conveyor with equally spaced decorations, and a contact region between the transport conveyor and the carrier conveyor forming a transfer location, wherein there are disposed in the region of the transfer location means for applying pressure and means for heating the decoration.

Processes and apparatus of this type are used, for example, in the food and beverage industry for decorating packages made from paper, plastic, glass or metal.

The thermal transfer process is, for various reasons, rapidly emerging as the dominant process for decorating packages in the manner described above, overtaking other processes, for example labeling processes.

The decoration motif is pressed onto a carrier conveyor through conventional pressure techniques in such a way that the motif is attached to the carrier conveyor through an adhesive means with a smaller adhesive force and covered with another adhesive means with a larger adhesive force. A carrier conveyor set up in this fashion is brought in contact with the packages to be decorated. By applying pressure and heat in this contact region, the decoration is released from the transport conveyor and simultaneously bonded to the package. Heat is hereby supplied through the package.

This process can consequently only be used with packages with a large heat capacity, such as glass bottles.

2. Description of the Related Art

A continuous process and an apparatus therefor, wherein the thermal transfer process can also be used for packages with a smaller heat capacity, for example plastic packages, are described in DE 44 37 379.1. Herein, the carrier conveyor is separated into individual sections, with each section carrying one print motif, and transported to heated application segments which are arranged on an application transport means with equal spacing therebetween. The application transport means briefly captures the packages in such a way that one package is associated with each transport segment. The decoration is then transferred from the individual section to the package during the transport. This process, however, requires rather complex mechanisms due to the large number of discrete process steps.

SUMMARY OF THE INVENTION

In addition, it is difficult to coordinate the large number of individual movements of the feed screws for the packages, the application transport means for the packages and the application segments, the application segments, the packages, the continuous conveyor for the decorations and the cutting device. This coordination of the individual movements can only be accomplished with the help of a complex gear and cam control or implemented by employing corresponding electrical drives.

Moreover, the handling of the individual label segments limits the efficiency of the machine. It is particularly disadvantageous that the transfer of thermal energy into the label material cannot be adapted to the operating speed of the machine. As a result, the variable efficiency range of the machine is severely limited which adversely effects a turnkey production line. There is also the danger that the label material and thin-wall plastic packages can be thermally damaged at low speed.

The packages printed with the thermal transfer process generally require a heat post-treatment for rendering the transferred color image glossier, for allowing the dyes to dry, and for improving the adhesion of the backing.

For this purpose, it has been proposed in DE 44 27 870.5 to transport the freshly printed packages while the image is still wet, to a separate oven with the help of separate conveying means.

It is also known in the art to employ—instead of an oven—an open flame, in combination with a rotation of the packages. An open flame, however, puts severe demands on the equipment technology and, in addition, prevents the use of plastic packages since these may become deformed.

It is therefore the object to provide a process and an apparatus of the type described above which operates over a large variable operating range and is of simple design.

The object is solved by the process in that the transport conveyor and the carrier conveyor move in opposite directions, wherein the ratio of the spacing between the packages on the transport conveyor to the velocity of the transport conveyor is the same as the ratio of the spacing between the decorations on the carrier conveyor to the velocity of the carrier conveyor. Moreover, in the region of the transfer location, the package is adjusted to a circumferential velocity corresponding to the velocity of the carrier conveyor, while the required heat is applied to the carrier conveyor.

It is a particular advantage of the invention that the circumferential velocity of the packages is extremely high. This velocity is derived in a known fashion by adding the velocity of the transport conveyor to the velocity of the carrier conveyor; in this case, however, the velocities have to be added with the same sign.

The high circumferential velocity makes possible a continuous operation since the respective spacings between the packages on the transport conveyor and the respective spacings between the decorations on the carrier conveyor are now independent of each other. It is no longer necessary to cut the individual sections in order to match the carrier conveyor. In addition, the extremely short contact time also avoids a temperature transfer from the carrier conveyor to the package which is particularly advantageous with plastic packages. Furthermore, the two temperature-dependent adhesive layers on the carrier conveyor are not affected.

It is particularly advantageous if the packages are not driven separately, but through the movement of the carrier conveyor. The coordination between movements of the package and the carrier conveyor which is otherwise required, is thereby eliminated.

It is also advantageous if simultaneously with the package to be decorated, the subsequent package, as viewed in the direction of motion, is also driven by the carrier conveyor. The subsequent package thereby undergoes an acceleration phase, thus averting a difference in velocity between the package and the carrier conveyor during the transfer.

It is furthermore advantageous if the required heat is supplied to the carrier conveyor before or at the transfer location. In this way, the heat supply can be optimally metered and adjusted in close proximity to the transfer location, making possible an accurate calculation of the heat loss.

It is particularly advantageous if the heat-up time depends on the velocity of the carrier conveyor and if the control thereof is automatic.

This again aids the heat conduction and improves the quality of the transfer of the decoration. It is particularly advantageous if the freshly decorated packages move past a heat post-treatment unit for attaining a higher color luster. Here, the existing transport conveyor is advantageously employed for moving the packages past a stationary temperature-controlled heat source.

The object of the invention is also solved by an apparatus, wherein the drive means for the transport conveyor and the carrier conveyor are designed to enable opposing directions of movement and wherein a guide element for the carrier conveyor is adapted for applying pressure and for transferring heat. The guide element can move transversely to the direction of movement of the carrier conveyor, and is pre-loaded and formed as a heating element.

It is advantageous to construct the receiving means for the packages in such a way that they can rotate freely, and to drive the package to be decorated, or the package to be decorated and the subsequent package, with the help of the carrier conveyor.

It is also possible to use a separate conventional drive. In this case, means have to be employed for providing identical circumferential velocities. It is also possible to combine both drive options. A separate drive then generates a velocity on the package which is smaller than the required velocity, whereby the difference in velocities is made up by the carrier conveyor. In this case, the separate drive has to be equipped with an additional free-wheel.

In a practical embodiment, the guide element is preceded by a moveable heating element. By changing the position of the heating element, the size of the contact surface between the heating element and the carrier conveyor can be continuously adjusted between zero and a maximum value. In this manner, the heat-up time can advantageously be matched to the velocity of the carrier conveyor.

The convex shape of the guide surface of the heating element increases the contactability and improves the heat transfer.

The heating element is advantageously adapted for pivotal movement.

It is furthermore advantageous to make the heating element stationary and to operably connect the heating element to a swivel arm. The swivel arm has a deflection roller for the carrier conveyor for adjusting the contact surface between the heating element and the carrier conveyor.

The heating element or the swivel arm can have their own actuating drive or can be driven by their weight if attached accordingly.

The corresponding control operation can be carried out automatically.

The heating element can also be constructed from two parts. The moveable heating element then functions as a pre-heater, whereas the pressure head functions as the actual heating element.

Special attention has to be paid to a selected heat post-treatment of the decoration, so that the colors can be provided with a high degree of luster and the adhesion to the base is improved. These requirements are essentially met by a stationary and electrically powered hot plate or a stationary hot air gun. With both devices, the existing transport conveyor of the carousel is advantageously used for transporting the packages. The time of the heat post-treatment can be uniquely specified from the length of the active heating surface and the velocity of the transport conveyor.

BRIEF DESCRIPTION OF THE DRAWINGS

The invention will now be discussed with reference to an embodiment.

It is shown in.

DETAILED DESCRIPTION OF A PREFERRED EMBODIMENT

The apparatus for decorating includes mainly a transport unit for the packages and a transport unit for the decorations, wherein both have a common interface for transferring the decorations to the packages.

Figure 1:
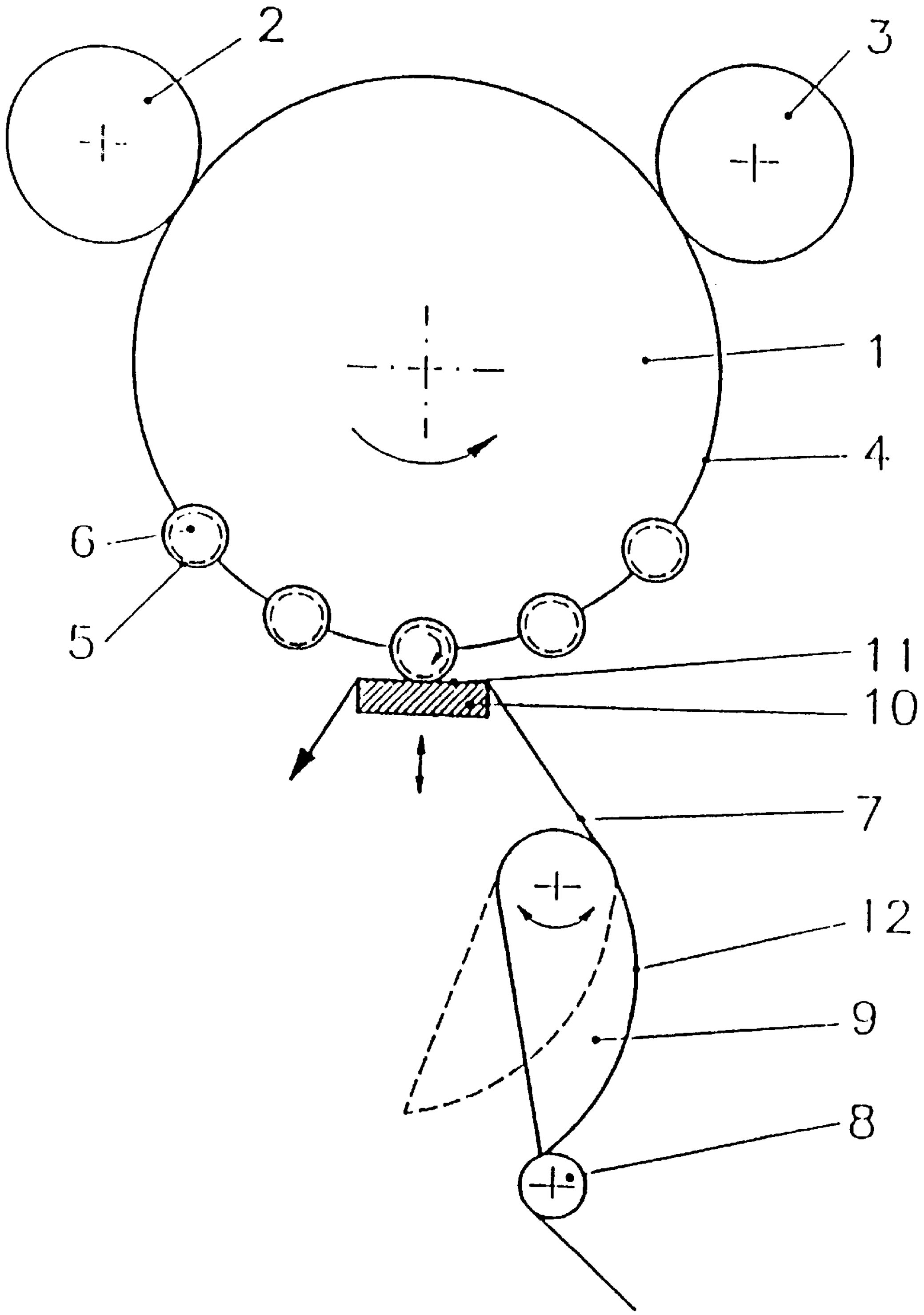
FIG. 1 is a schematic top view of the apparatus for decorating.

Referring now to FIG. 1, the transport unit for packages is constructed as a rotatable carousel 1. The carousel 1 is provided with a drive (not shown), an input station 2, an output station 3 and a transport conveyor 4 for the packages 5. On the transport conveyor 4, there are arranged receiving means 6 with substantially equal distances therebetween for receiving the packages 5 to be decorated. These receiving means 6 are designed to rotate freely.

The transport unit for the decorations includes a carrier conveyor 7 which is pulled under tension by a drive (not shown), and a corresponding guide element for this carrier conveyor 7. The carrier conveyor 7 is constructed in a conventional manner and carries—with the help of an adhesive with a smaller adhesion force—decorations arranged with substantially equal distance therebetween. The top surfaces of the decorations are coated with a different adhesive having a greater adhesion force.

The guide elements have at least one deflection roller 8, a pivoted heating element 9 and a pressure head 10 which is moveable in the direction of the packages 5. The pivoted heating element 9 has an outer guide surface 12 with a preferably convex shape, and an upper pivot. The heating element 9 can be pivoted about this pivot by a drive of conventional design in the direction transverse to the direction of movement of the carrier conveyor 7. This resulting contact surface between the guide surface 12 and the carrier conveyor 7 changes its size depending on the pivoting angle. The pressure head 10 also has an outer, preferably flat guide surface 11 and is driven in the direction of the carousel 1 by a preloaded compression spring or by another conventional drive system. The transport conveyor 4 for the packages 5 and the carrier conveyor 7 for the decorations are oriented tangentially with respect to each other in the region of the pressure head 10, whereby the movement of the transport conveyor 4 is opposite to that of the carrier conveyor 7. Consequently, the carrier conveyor 7 and the packages 5 directly contact each other and thereby also the freely rotatable receiving means 6 in these regions.

Figure 2:
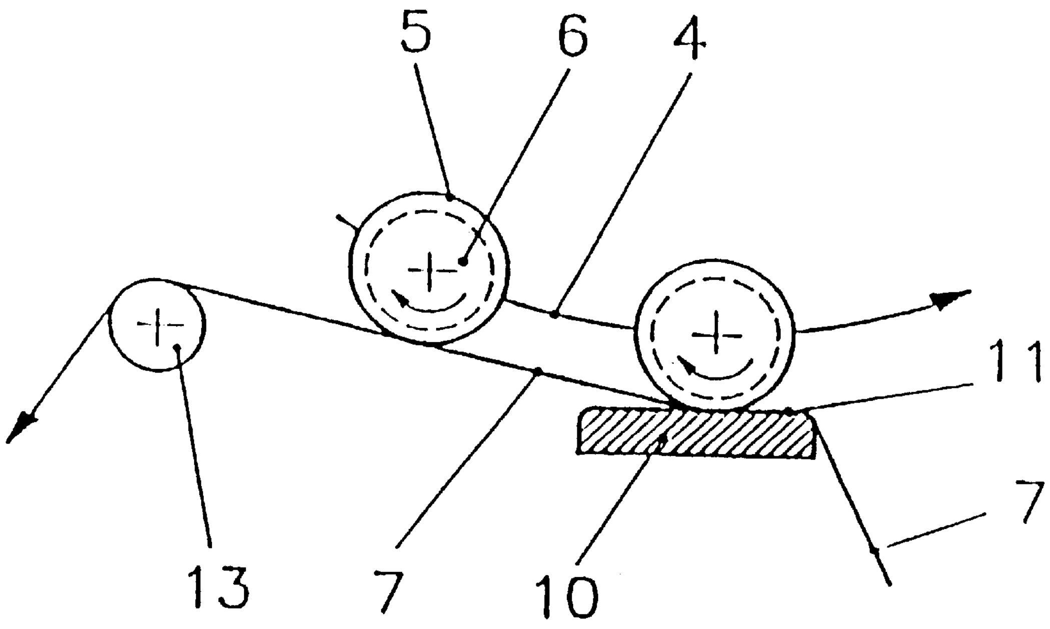
FIG. 2 is a practical embodiment for driving the packages with the help of the carrier conveyor.

As depicted in FIG. 2, in a special arrangement, a deflection roller 13 can be disposed following the pressure head 10 in the direction of movement of the carrier conveyor 7. The deflection roller 13 is here located outside the transport conveyor 4 at a distance from the pressure head 10 which is larger than the distance between the packages 5, thereby enabling contact between the carrier conveyor 7 from which the decoration was removed, and the following package 5.

Figure 3:
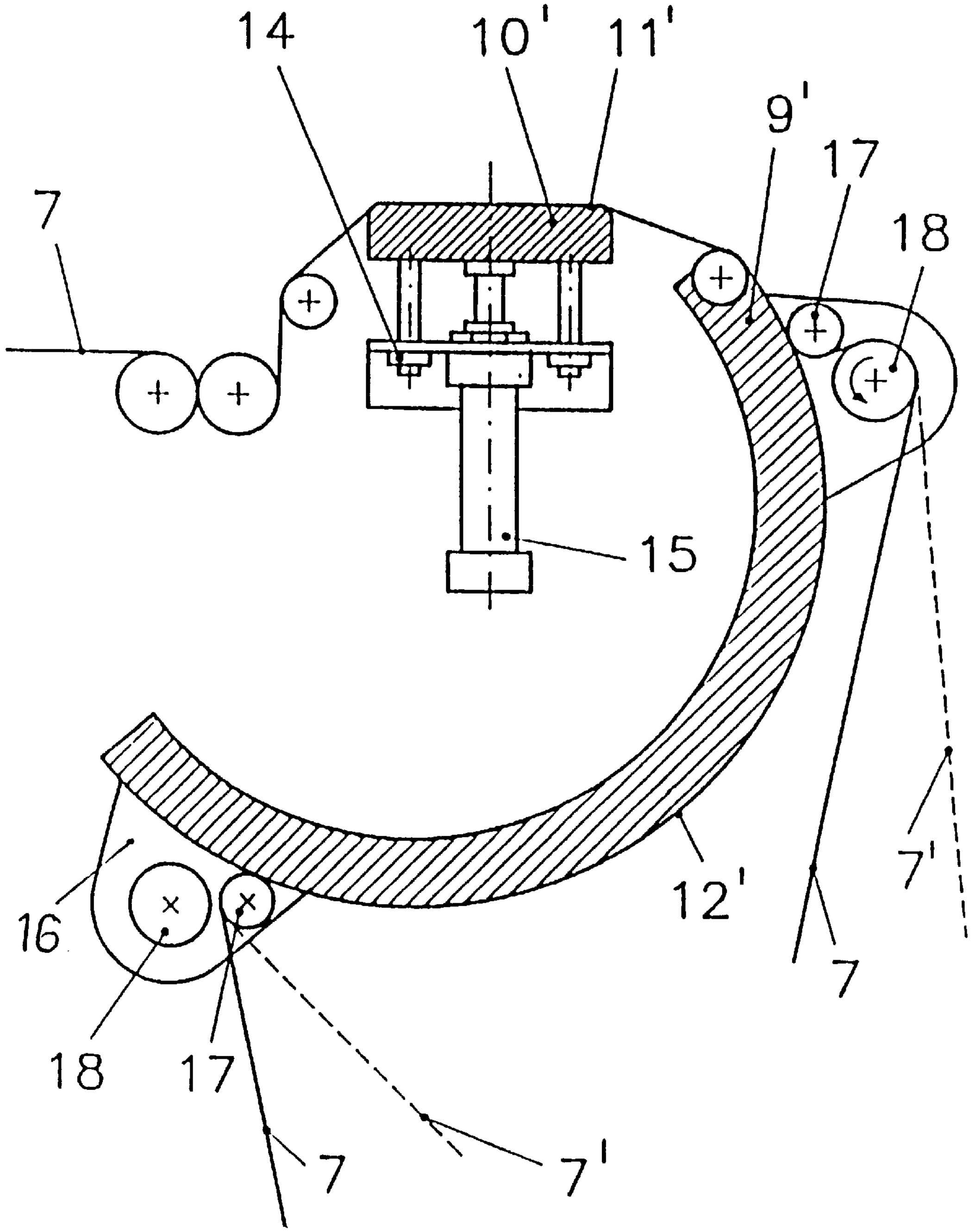
FIG. 3 is a practical embodiment for the heating unit of the carrier conveyor.

Referring now to FIG. 3, the guide element for the carrier conveyor 7 is formed of the pressure head 10' and the heating element 9'. The distance between the pressure head 10' and the heating element 9' is fixed. The pressure head 10' has an outer guide surface 11', a mechanical preset unit 14 and a pneumatic drive 15.

The heating element 9' is provided with an outer convex guide plane 12' and is operably connected with a swivel arm 16. The head of this swivel arm 16 is provided with a deflection roller 17 and with a spacer roller 18. The swivel arm 16 furthermore includes a drive (not shown) for changing the position of the deflection roller 17 with respect to the heating element 9'. This position is set depending on the velocity of the carrier conveyor 7 and determines the size of the contact surface between the heating element 9' and the carrier conveyor 7. At a slow velocity, the deflection roller 17 is positioned closer to the pressure head 10', moving away from the pressure head 10' at a higher velocity. The spacer roller 18 keeps the carrier conveyor 7 away from the heating element 9' in the region before the deflection roller 17.

The carrier conveyor 7' is shown the position when the roller with the carrier conveyor 7 has rolled off.

Figure 4:
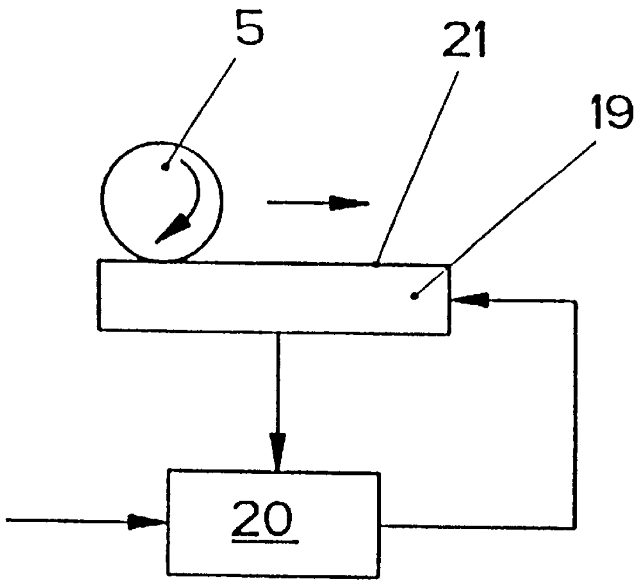
FIG. 4 is a heat post-treatment unit.

The heat post-treatment unit which is depicted in FIG. 4, includes a stationary, electrically powered hot plate 19 and a controller 20 which can be set to a nominal temperature. The hot plate 19 can be provided with a flat or with a concave hot surface 21, depending if the transport direction of the packages 5 follows a linear or a circular path. For example, if the transport conveyor 4 of the carousel 1 is also used for the heat post-treatment of the packages 5, then a hot surface 21 with a concave shape is advantageous. After a suitable shape of the hot surface 21 has been selected, a certain heat post-treatment time can be defined depending on the length of the hot surface 21.

For the purpose of driving the rotation of the packages 5, the existing friction between the moving packages 5 and the stationary hot plate is once again preferably utilized.

Figure 5:
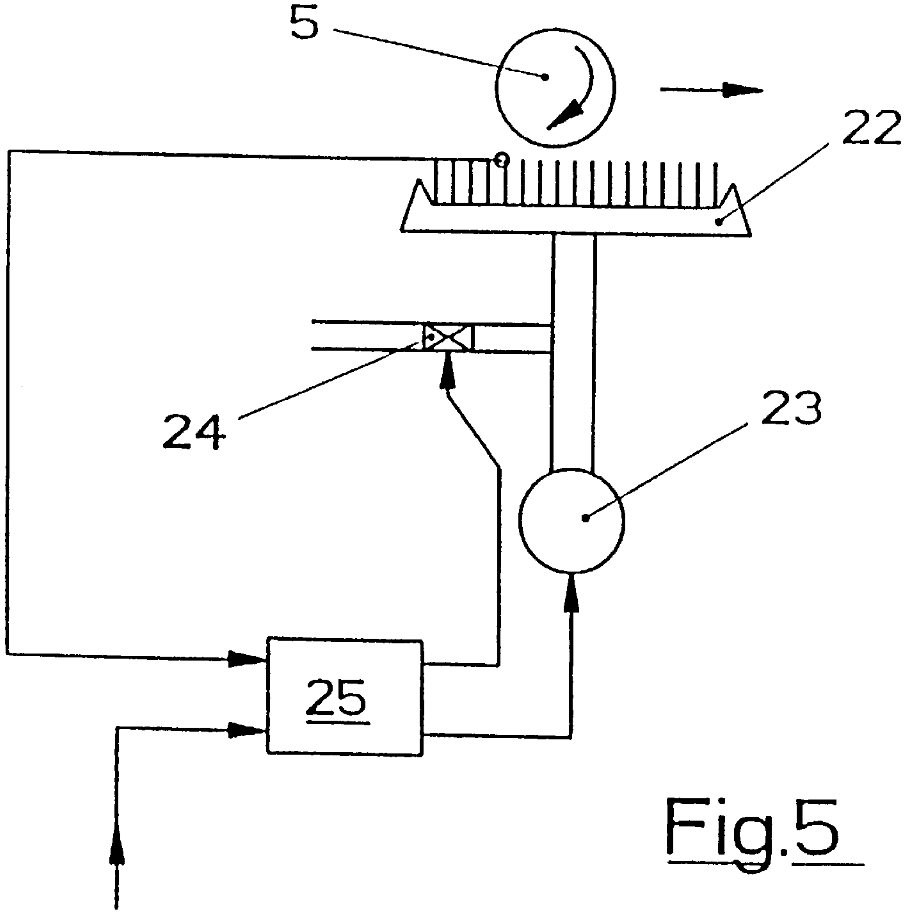
FIG. 5 is a different heat post-treatment unit.

A heat post-treatment unit of the type depicted in FIG. 5 primarily includes a nozzle 22, a temperature-controlled hot air generator 23, a volume-controlled bypass valve 24 and a temperature and volume controller 25.

The packages 5 are again located on a linear or circular path. A separate drive is required for rotating the packages 5.

The material of the packages 5 has to be taken into consideration when the nominal temperature setting for the controller 20 or for the temperature and volume controller 25 is specified. Special attention has to be paid to packages 5 made of plastic. In order to prevent packages 5 made of plastic from being deformed, it may be appropriate to stabilize such plastic packages 5 with blown-in compressed air.

The operation of the apparatus will now be described with reference to FIG. 1.

The carousel 1 and the carrier conveyor 7 are each driven with a selected, but constant velocity, with the carousel 1 and the carrier conveyor 7 moving in opposite directions. The packages 5 placed onto the receiving means 6 by the input station 2 are transported on the transport conveyor 4 in the direction of the pressure head 10. Simultaneously, the decorations which have been heated to the desired temperature at the heating element 9, move in the opposite direction towards the pressure head 10.

Through the contact which is created between each package 5 and the carrier conveyor 7 in the region of the pressure head 10, the package 5 which can rotate freely on the receiving means 6, begins to rotate. Hereby, a circumferential velocity is established on the package 5 which has the same magnitude as the velocity of the carrier conveyor 7. The package 5 rolls on the carrier conveyor 7 under the influence of the pressure exerted by the pressure head 10. As a result, the decoration is released from the carrier conveyor and adheres to the package 5.

The packages 5 subsequently pass through one of the heat post-treatment units.

What is claimed is:

1. A process for continuously placing decorations on packages having convex surfaces, the packages are moved on a transport conveyor with a superimposed autorotation and the decorations are moved on a carrier conveyor tangentially past a transfer location and with a constant velocity, the decorations are sequentially transferred to the packages by applying pressure and heat so that the decorations undergo a heat post-treatment, comprising the steps of

- moving the transport conveyor (4) and the carrier conveyor (7, 7') in opposite directions;
- maintaining a ratio of spacing between the packages (5) on the transport conveyor (4) to the velocity of the transport conveyor (4) the same as the ratio of the spacing between the decorations on the carrier conveyor (7, 7') to the velocity of the carrier conveyor (7, 7');
- accelerating the rotating packages (5) in the region of the transfer location to a circumferential velocity corresponding to the velocity of the carrier conveyor (7, 7');
- supplying heat to the carrier conveyor (7, 7'); and
- moving the rotating packages (5) subsequently past a stationary and temperature-controlled heat source.

2. The process according to claim 1, wherein the rotation of the packages (5) is driven by the movement of the carrier conveyor (7, 7').

3. The process according to claim 2, wherein each package (5) is accelerated by the carrier conveyor (7, 7') before reaching the transfer location.

4. The process according to claim 1, wherein the heat is supplied to the carrier conveyor (7, 7') before or at the transfer location.

5. The process according to claim 4, wherein the heat-up time of the carrier conveyor (7, 7') depends on the velocity of the carrier conveyor (7, 7').

6. The process according to claim 5, wherein the heat-up time of the carrier conveyor (7, 7') is controlled automatically.

7. The process according to claim 1, wherein the packages (5) made of plastic are stabilized by blown-in compressed air.

8. An apparatus for continuously decorating packages with convex surfaces, comprising:

- a driveable continuous transport conveyor with uniformly spaced, driveable and rotating receiving means for the packages;
- a driveable continuous carrier conveyor with uniformly spaced decorations;
- a contact region between the transport conveyor and the carrier conveyor, said contact region forming a transfer location, wherein there are disposed in the region of the transfer location means for applying pressure onto the carrier conveyor in the direction of the packages and means for heating the decoration, and following the transfer region, there are disposed means for heat post-treatment;

the drive means for the transport conveyor (4) and the carrier conveyor (7, 7') are designed for opposing directions of movement, the means for applying pressure and heat are formed by a guide element, which is moveable transversely to the direction of movement of the carrier conveyor (7, 7') and which is pre-loaded, and which is formed as a heating element, and the means for heat post-treatment comprise a stationary temperature-controlled heat source and a transport conveyor for the packages (5).

9. The apparatus according to claim 8, wherein the receiving means (6) for the packages (5) are designed to rotate freely and that each receiving means (6) can be driven by the carrier conveyor (7, 7') via the packages (5).

10. The apparatus according to claim 9, wherein the carrier conveyor (7, 7') is guided in such a way that a region of the carrier conveyor (7, 7') from which a decoration has been removed, makes contact with at least one other package (5).

11. The apparatus according to claim 9, wherein the receiving means (6) for the packages (5) comprise a separate drive.

12. The apparatus according to claim 8, wherein the receiving means (6) comprise a separate drive for providing a velocity which is smaller than the required velocity, and that the required velocity is generated through contact between the packages (5) and the carrier conveyor (7, 7').

13. The apparatus according to claim 8, wherein the guide element is preceded by a moveable heating element (9, 9') with a contact surface, wherein the size of the contact surface between the heating element (9, 9') and the carrier conveyor (7, 7') can be adjusted continuously between zero and a maximum value.

14. The apparatus according to claim 13, wherein the contact surface of the heating element (9, 9') has a convex shape.

15. The apparatus according to claim 14, wherein the moveable heating element (9, 9') is adapted for pivotal movement and comprises an actuating drive for providing a pivoting path which depends on the velocity of the carrier conveyor (7, 7').

16. The apparatus according to claim 15, wherein the pivoting path is adjusted automatically.

17. The apparatus according to claim 15, wherein the moveable heating element (9, 9') is constructed with a lateral pivot point and with a lower contact surface and that the pivoting path is derived from the ratio of the mass of the heating element (9, 9') and the velocity-dependent lifting force of the carrier conveyor (7, 7').

18. The apparatus according to claim 17, wherein the pressure head (10, 10') is formed as a heating element and the moveable heating element (9, 9') is formed as a pre-heating element.

19. The apparatus according to claim 8, wherein the heat source of the post-treatment unit comprises an electrically powered hot plate (19) with a flat or concave hot surface (21) and a controller (20) which is adjustable to a nominal temperature.

20. The apparatus according to claim 19, wherein the flat hot surface (21) relates to a linear transport conveyor and the concave hot surface (21) relates to a circular transport conveyor for the packages (5) and that the length of the effective hot surface (21) is specified for a nominal post-heat-treatment time.

21. The apparatus according to claim 20, wherein the packages (5) are arranged on the transport conveyor of the post-treatment unit in such a way that they can rotate freely, and are driven by the stationary hot plate (19).

22. The apparatus according to claim 8, wherein the heat source of the post-treatment unit comprises a nozzle (22), a temperature-controlled hot air generator (23), a volume-controlled bypass valve (24) and a temperature and volume controller (25), and that the packages (5) comprise a separate drive for the rotation.

* * * * *

UNITED STATES PATENT AND TRADEMARK OFFICE

CERTIFICATE OF CORRECTION

PATENT NO. : 6098,689

DATED : August 8, 2000

INVENTOR(S) : Wolfgang FIWEK and Gerd-Reiner ISRAEL

It is certified that error appears in the above-indentified patent and that said Letters Patent is hereby corrected as shown below:

On the title page

Inventors should be corrected to read:

-- Inventors: Wolfgang FIWEK, Obere Lindenstrasse 2; Gerd-Reiner ISRAEL, Dresden, Germany --

Signed and Sealed this

Twenty-fourth Day of April, 2001

Attest:

Nicholas P. Godici

NICHOLAS P. GODICI

*Attesting Officer*

*Acting Director of the United States Patent and Trademark Office*